United States Patent
Matsuoka et al.

(10) Patent No.: US 8,242,744 B2
(45) Date of Patent: Aug. 14, 2012

(54) BATTERY CHARGER AND DETECTION STRUCTURE FOR DETECTING MOUNTED COMPACT ELECTRIC APPARATUS

(75) Inventors: Yasuhide Matsuoka, Hikone (JP);
Fumio Taniguchi, Moriyama (JP);
Daisuke Sone, Otsu (JP)

(73) Assignee: Panasonic Corporation, Osaka (JP)

(*) Notice: Subject to any disclaimer, the term of this patent is extended or adjusted under 35 U.S.C. 154(b) by 464 days.

(21) Appl. No.: 12/684,463

(22) Filed: Jan. 8, 2010

(65) Prior Publication Data
US 2010/0181965 A1  Jul. 22, 2010

(30) Foreign Application Priority Data

Jan. 16, 2009  (JP) ................................. 2009-007692

(51) Int. Cl.
*H02J 7/00* (2006.01)
*H02K 7/14* (2006.01)
*B26B 19/02* (2006.01)

(52) U.S. Cl. ........ 320/115; 320/107; 320/112; 320/114; 310/50; 30/43.92; 30/34.1; 30/43.9

(58) Field of Classification Search ................... 320/115
See application file for complete search history.

(56) References Cited

U.S. PATENT DOCUMENTS

| | | |
|---|---|---|
| 5,867,798 A | 2/1999 | Inukai et al. |
| 6,924,625 B2* | 8/2005 | Teraoka et al. ............... 320/150 |
| 7,150,285 B2* | 12/2006 | Saito et al. ................. 134/100.1 |
| 2004/0189245 A1* | 9/2004 | Teraoka et al. ............... 320/107 |
| 2005/0189207 A1 | 9/2005 | Hoser et al. |
| 2006/0162749 A1* | 7/2006 | Saito et al. ..................... 134/111 |
| 2008/0012528 A1* | 1/2008 | Takaoka et al. ............... 320/115 |
| 2008/0041914 A1* | 2/2008 | Simonelli et al. ............. 227/132 |

FOREIGN PATENT DOCUMENTS

| | | |
|---|---|---|
| EP | 1 473 795 | 11/2004 |
| EP | 1 878 545 | 1/2008 |
| JP | 2008-18128 | 1/2008 |

* cited by examiner

*Primary Examiner* — Yalkew Fantu
(74) *Attorney, Agent, or Firm* — Greenblum & Bernstein, P.L.C.

(57) ABSTRACT

In a battery charger for charging a built-in secondary battery of a compact electric apparatus such as an electric shaver, an erroneous detection due to incomplete mounting of the compact electric apparatus on a mounting base is prevented with a simple and inexpensive configuration. A detection structure for detecting mounting of the compact electric apparatus on the mounting base comprises a charge contact member, a common contact member and a signal contact member which are electrically connected to a positive power source line, a negative power source line and a control signal line of the compact electric apparatus, respectively. A detection contact which electrically connects the signal contact member to the common contact member when the compact electric apparatus is not mounted on the mounting base is integrally formed on the signal contact member. When compact electric apparatus is mounted on the mounting base, the detection contact is displaced corresponding to mounting of the compact electric apparatus so that the signal contact member is electrically disconnected from the common contact member. Thereby, it is possible to detect that the compact electric apparatus is mounted on the mounting base.

24 Claims, 4 Drawing Sheets

BATTERY CHARGER AND DETECTION STRUCTURE FOR DETECTING MOUNTED COMPACT ELECTRIC APPARATUS

BACKGROUND OF THE INVENTION

1. Field of the Invention

The present invention relates to a battery charger for charging a built-in battery of a compact electric apparatus such as an electric shaver and a structure for detecting the compact electric apparatus mounted on a mounting base of the battery charger.

2. Description of the Related Art

Conventionally, a mounting base for a compact electric apparatus such as an electric shaver has contact members through which electric power for charging a built-in secondary battery and control signals to transmit to the compact electric apparatus are provided (refer to Japanese Laid-Open Patent Publication No. 2008-18128, for example). In such a kind of mounting base, a detection unit to detect that the compact electric apparatus is mounted thereon is separately provided from the contact members, and a push-fit type detection switch is generally used as the detection unit.

In the conventional mounting base described above, the contact members and the detection switch are located separately from each other. Thus, unless the compact electric apparatus is held on the mounting base properly, it may be erroneously judged that the compact electric apparatus is properly mounted on the mounting base when the detection switch is pressed. In such a case, the contact members of the mounting base do not contact with the terminals of the compact electric apparatus, electric charge of the built-in secondary battery of the compact electric apparatus cannot be performed, for example. In addition, the contact members and the detection unit are configured as different functional components, so that a number of components and production cost of the mounting base increase.

SUMMARY OF THE INVENTION

The present invention is conceived to solve the problem described above, and an object of the present invention is to provide a battery charger and a structure for detecting a mounted compact electric apparatus which can prevent an erroneous detection caused by an incomplete mounting of the compact electric apparatus on the battery charger, with a simple and inexpensive configuration.

A battery charger in accordance with an aspect of the present invention comprises:

a mounting base on which a compact electric apparatus having a built-in secondary battery is mounted;

a charging circuit which supplies a charging power;

a detection circuit which detects mounting of the compact electric apparatus on the mounting base;

a control circuit which controls the charging circuit to charge the built-in secondary battery when the detection circuit detects mounting of the compact electric apparatus on the mounting base;

a charge contact member which has a charge contact electrically connected to a positive terminal of the charging circuit and connected to a positive line of the compact electric apparatus when the compact electric apparatus is mounted on the mounting base to charge the built-in secondary battery of the compact electric apparatus;

a common contact member which has a common contact electrically connected to a negative terminal of the charging circuit and the detection circuit and connected to a negative power source line of the compact electric apparatus when the compact electric apparatus is mounted on the mounting base;

a signal contact member which has a signal contact and a detection contact and is displaced by contacting with the compact electric apparatus when the compact electric apparatus is mounted on the mounting base, the signal contact being electrically connected to a the detection circuit and the control circuit and connected to a control signal line of the compact electric apparatus when the compact electric apparatus is mounted on the mounting base, and the detection contact electrically connecting the signal contact member to the common contact member when the compact electric apparatus is not mounted on the mounting base, and electrically disconnecting the signal contact member from the common contact member by displacement thereof when the compact electric apparatus is mounted on the mounting base, wherein the detection circuit detects the mounting of the compact electric apparatus on the mounting base by detecting variations of electric potentials of the common contact member and the signal contact member.

According to such a configuration, since the detection contact 5e which is integrally formed on the signal contact member electrically connects the signal contact member to the common contact member when the compact electric apparatus is not mounted on the mounting base, electric potentials of the signal contact member and the common contact member are the same. When compact electric apparatus is mounted on the mounting base, the detection contact is displaced corresponding to mounting of the compact electric apparatus so that the signal contact member is electrically disconnected from the common contact member. Thus, electric potentials of the signal contact member and the common contact member vary when the compact electric apparatus is mounted on the mounting base. The detection circuit can detect the mounting of the compact electric apparatus on the mounting base by detecting variations of electric potentials of the common contact member and the signal contact member.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1A:
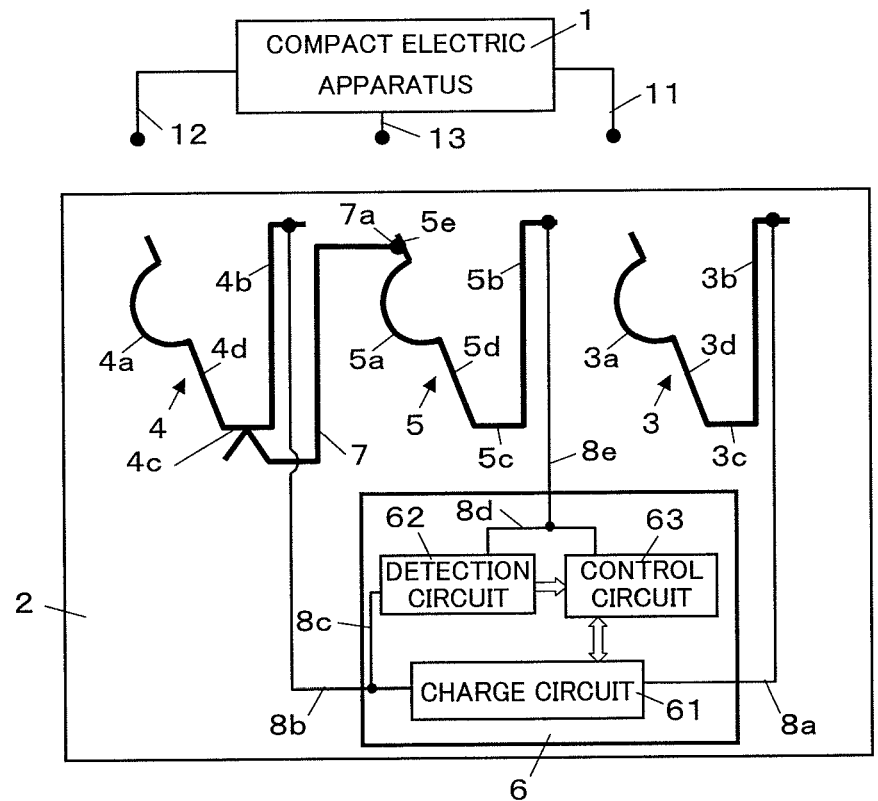
FIG. 1A is a diagram showing a block configuration of a battery charger and a structure for detecting a mounted compact electric apparatus in accordance with an embodiment of the present invention before mounting the compact electric apparatus on the battery charger.
Figure 1B:
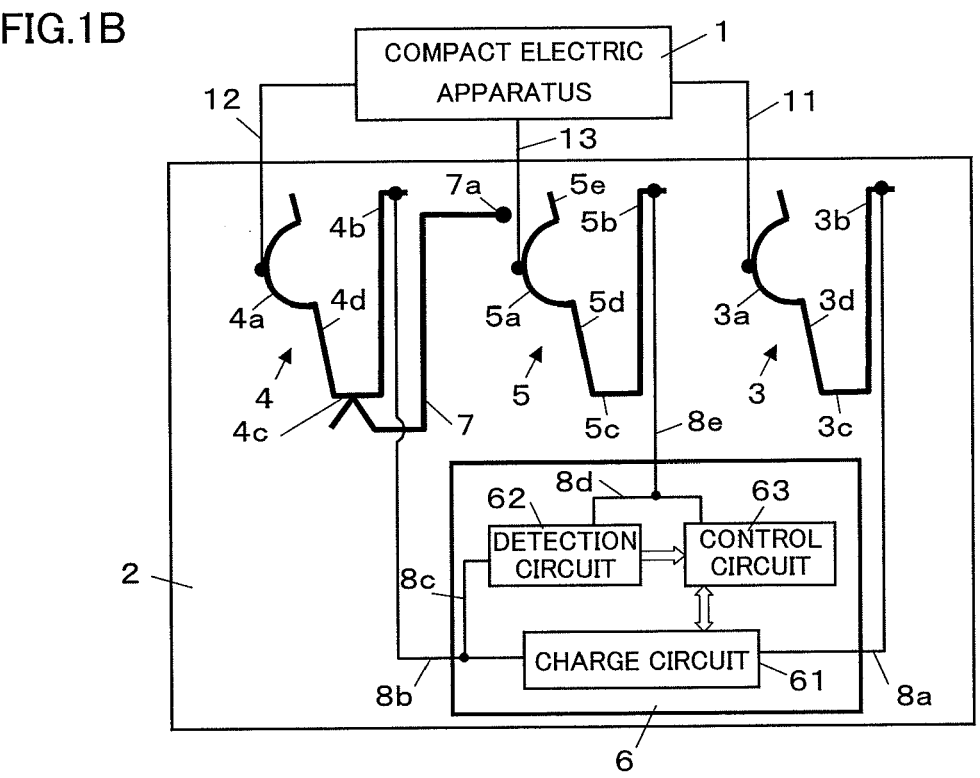
FIG. 1B is a diagram showing a block configuration of the battery charger and the structure for detecting the mounted compact electric apparatus after mounting the compact electric apparatus on the battery charger.

A battery charger and a detection structure for detecting a mounted compact electric apparatus on the battery charger in accordance with an embodiment of the present invention (abbreviated as the "detection structure" hereinafter) is described below with reference to figures. FIG. 1A shows the detection structure before mounting a compact electric apparatus 1 on a battery charger 2, and FIG. 1B shows the detection structure after mounting the compact electric apparatus 1 on the battery charger 2. The detection structure comprises the battery charger 2 on which the compact electric apparatus 1 is mounted and detects that the compact electric apparatus 1 is mounted on the battery charger 2.

When the compact electric apparatus 1 is mounted on the battery charger 2, charging for a built-in secondary battery or other various controls of the compact electric apparatus 1 are performed, so that the compact electric apparatus 1 has a positive power source line 11 and a negative power source line 12 for charging the secondary battery and a control signal line 13. The battery charger 2 comprises a charge contact member 3 which has a charge contact 3a, a common contact member 4 which has a common contact 4a, a signal contact member 5 which has a signal contact 5a, and a controller 6 which controls the battery charger 2. When the compact electric apparatus 1 is mounted on the battery charger 2, the charge contact 3a, the common contact 4a, and the signal contact 5a are electrically connected to the positive power source line 11, the negative power source line 12, and the control signal line 13, respectively.

Figure 4:
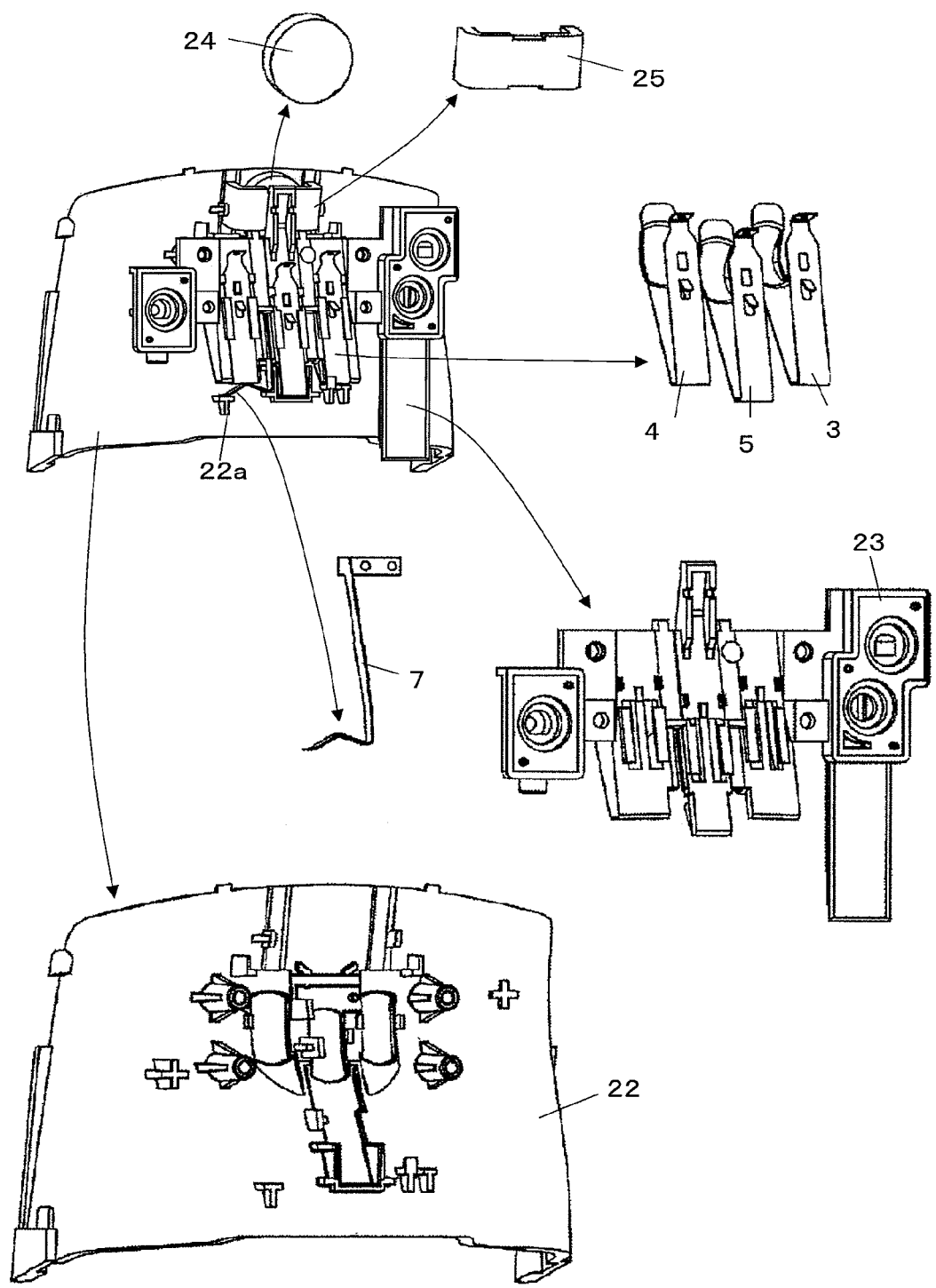
FIG. 4 is a rear perspective view showing a configuration for mounting a charge contact member, a common contact member, and a signal contact member in the cleaning-charging apparatus.

The charge contact member 3 is made of an elastic-conductive material. The charge contact member 3 is configured so that the charge contact 3a is displaced by contacting with the compact electric apparatus 1 when the compact electric apparatus 1 is mounted on the battery charger 2. The charge contact member 3 has a held portion 3b which is vertically held on the battery charger 2, a horizontal portion 3c which extends from a lower end of the held portion 3b in a horizontal direction, and a displacing portion 3d which extends obliquely upward from an end of the horizontal portion 3c. The charge contact 3a is formed semi-spherically protrude outward in a middle of the displacing portion 3d. The common contact member 4 and the signal contact member 5 also have substantially the same shape and made of the same material as those of the charge contact member 3. Hereupon, an amount of displacement of the signal contact 5a when the compact electric apparatus 1 is mounted on the battery charger 2 is set to be equal to or smaller than that of the charge contact 3a and the common contact 4a. Specifically, as shown in FIG. 4, the charge contact 3, the common contact 4 and the signal contact 5 have the same shape and made of the same material, and the charge contact 3, the common contact 4 and the signal contact 5 are arranged in horizontal. However, the signal contact 5 is located at a position vertically lower than those of the charge contact 3 and the common contact 4. Thus, when detecting the mounting of the compact electric apparatus 1 on the battery charger 2, the charge contact 3a and the common contact 4a can easily contact with terminals of the compact electric apparatus 1 so that a charging power can be stably supplied to the compact electric apparatus 1.

The signal contact member 5 further has a detection contact 5e formed at a position near to a front free end of the displacing portion 5d. In a state that the compact electric apparatus 1 is not mounted on the battery charger 2 as shown in FIG. 1A, the detection contact 5e contacts a contact 7a formed at a first end of a conductive member 7 so that the signal contact member 5 is electrically connected to the common contact member 4. On the contrary, a state that the compact electric apparatus 1 is mounted on the battery charger 2 as shown in FIG. 1B, the displacing portion 5d displaces due to contacting with the compact electric apparatus 1, and thus, the detection contact 5e departs from the contact 7a of the conductive member 7 so that the signal contact member 5 is electrically disconnected from the common contact member 4. In other words, the detection contact 5e largely displaces than the signal contact 5a when the compact electric apparatus 1 is mounted on the battery charger 2, so that the signal contact member 5 is surely disconnected electrically from the common contact member 4. Consequently, the fact that the compact electric apparatus 1 is mounted on the battery charger 2 can be detected surely. In addition, since the detection contact 5e is displaced above the signal contact 5a in vertical direction, even when a fluid intrude into an inside of the battery charger 2 from an opening for the signal contact 5a formed on a housing of the battery charger 2 (refer to FIG. 3), the detection contact 5a is protected from the fluid. The conductive member 7 is fixed on the housing of the battery charger 2 and the other end thereof is electrically connected to the common contact member 4 at any time.

The controller 6 comprises a charge circuit 61 which supplies the charging power to the compact electric apparatus 1, a detection circuit 62 which detects mounting of the compact electric apparatus 1, and a control circuit 63 which performs various controls on the basis of the detection by the detection circuit 62. A plus terminal of the charge circuit 61 is connected to the charge contact member 3 via a lead wire 8a, and a minus terminal of the charge circuit 61 is connected to the common contact member 4 via a lead wire 8b. An end of the detection circuit 62 is connected to the common contact member 4 via a lead wire 8c, and the other end of the detection circuit 62 is connected to the signal contact member 5 via a lead wire 8d. The control circuit 63 is connected to the signal contact member 5 via a lead wire 8e.

In the battery charger 2 configured as above, when the compact electric apparatus 1 is not mounted on the battery charger 2, the detection contact 5e and the contact 7a constitute a normally closed switch by electrically connected to each other, and both ends of the detection circuit 62 are the same electric potential. Alternatively, when the compact electric apparatus 1 is mounted on the battery charger 2, the detection contact 5e is pressed inward to the inside of the battery charger 2, the detection contact 5e departs from the contact 7a and the signal contact member 5 is disconnected electrically from the common contact member 4, and the electric potentials of the both ends of the detection circuit 62 are varied. The detection circuit 62 detects that the compact electric apparatus 1 is mounted on the battery charger 2 from the variation of the electric potentials. In addition, due to the compact electric apparatus 1 is mounted on the battery charger 2, the charge contact member 3, the common contact member 4 and the signal contact member 5 are connected to the positive power source line 11, the negative power source line 12 and the control signal line 13, respectively. The control circuit 63 controls the charge circuit 61 to supply the charging power to the positive power source line 11 through the charge contact member 3 and also outputs various control signals to the control signal line 13 through the signal contact member 5.

As described above, according to this embodiment, when the contact members 3 to 5 are respectively connected to the lines 11 to 13, the detection contact 5e is displaced so that the signal contact member 5 is electrically disconnected from the common contact member 4 simultaneously, and thus, it is detected that the compact electric apparatus 1 is mounted on the battery charger 2. In other words, when the mounted compact electric apparatus 1 is not properly mounted on the battery charger 2, the detection contact 5e is not displaced so that the condition that the signal contact member 5 is maintained to be electrically connected to the common contact member 4, and thus, it is possible to prevent erroneous detection due to improper mounting of the compact electric apparatus 1 on the battery charger 2. Consequently, it is impossible not to detect that the compact electric apparatus 1 is mounted on the battery charger 2 even though the contact members 3 to 5 contact with the corresponding terminals of the compact electric apparatus 1. In addition, it is impossible to detect that the compact electric apparatus 1 is mounted on the battery charger 2 even though the contact members 3 to 5 do not contact with the corresponding terminals of the compact electric apparatus 1.

In addition, since the detection contact 5e is electrically integrated with the signal contact 5a, and the mounting/detachment of the compact electric apparatus 1 to/from the battery charger 2 can be detected on the basis of the electric potential difference between the signal contact member 5 and the common contact member 4 when the mounting of the compact electric apparatus 1 on the battery charger 2, so that it is no need to provide an additional circuit for detecting the electric conduction of the detection contact 5. Therefore, it is possible to reduce the production cost and to downsize the battery charger 2 due to reduction of the number of components. Moreover, since the elements having the same shape can be used commonly for the contact members 3 to 5, the production cost of the battery charger 2 can be further reduced.

Figure 2:
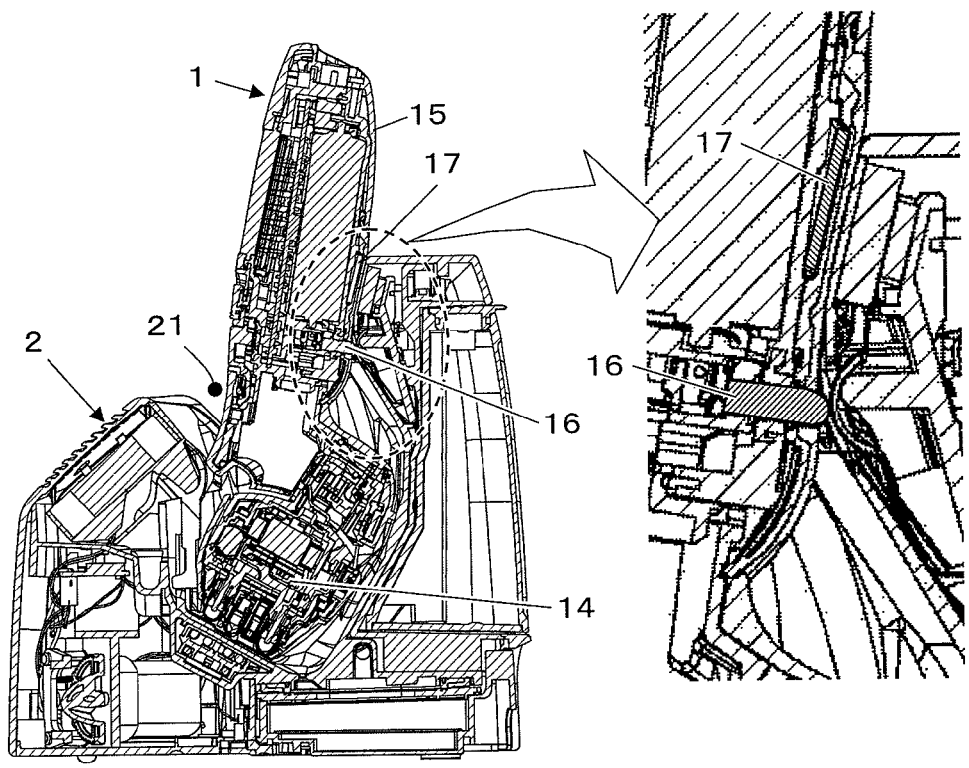
FIG. 2 is a cross-section view showing a configuration of a cleaning-charging apparatus and an electric shaver mounted thereon which is a specific example of the battery charger and the compact electric apparatus.
Figure 3:
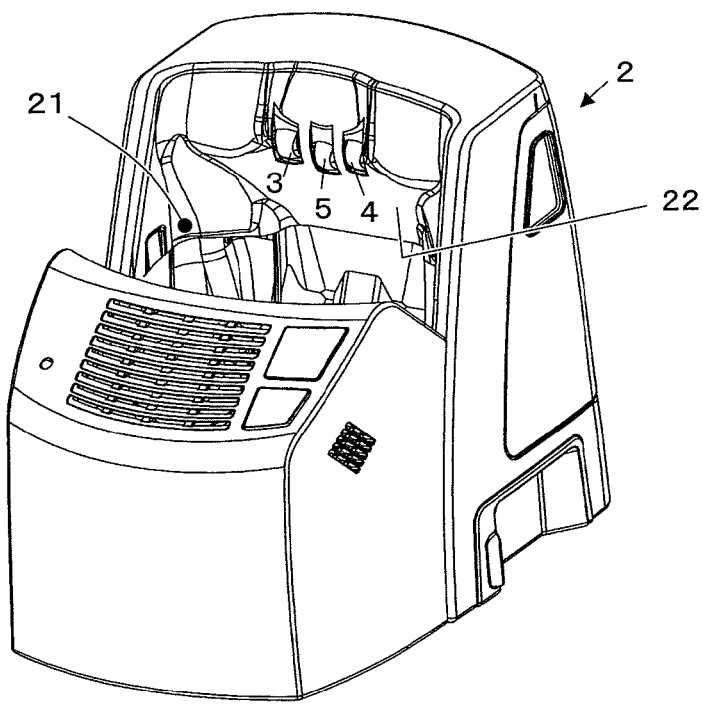
FIG. 3 is a perspective view showing an appearance of the cleaning-charging apparatus.

Subsequently, a specific application of the detection structure in accordance with this embodiment is described. As shown in FIGS. 2 and 3, in this specific application, the compact electric apparatus 1 is an electric shaver, and the battery charger 2 is a cleaning-charging apparatus for cleaning a head portion of the electric shave and charging a built-in secondary battery of the electric shaver. In the following description, they are called "electric shaver 1" and "cleaning-charging apparatus 2", respectively. In addition, elements the same as the elements in FIGS. 1A and 1B are described with reference to the same numerals.

The electric shaver 1 comprises a head portion 14 having inner blades and outer blades, a motor for deriving the inner blades, and so on, and a main body 15 having a built-in secondary battery to supply an electric power for driving the motor, and so on. Three terminal pins 16 (only one is illustrated in FIG. 2) which are to be connected to the positive power source line 11, the negative power source line 12 and the control signal line 13 are provided to protrude outward on a rear face of the main body 15.

The cleaning-charging apparatus 2 has a mounting base 21 on which the electric shaver 1 is held with the head portion 14 being directed downward. The charge contact member 3, the common contact member 4 and the signal contact member 5 which are electrically connected to the three terminal pins 16 of the electric shaver 1 respectively are provided on a rear wall 22 of the mounting base 21.

As shown in FIG. 4, the contact members 3 to 5 are supported by the rear wall 22 and a contact base 23 which is provided on a rear face of the rear wall 22. A permanent magnet 24 which attracts a metal plate 17 (refer to FIG. 2) provided on the rear face of the electric shaver 1 and a yoke 25 which has a substantially U shape in a sectional view and enhances a magnetic force of the magnet 24 are provided above the signal contact member 5. Thereby, an accuracy of mounting of the electric shaver 1 with respect to the cleaning-charging apparatus 2 is increased. A second end of the conductive member 7 is supported by a spring base 22a provided on the rear face of the rear wall 22 from below, as that it is pressed against the common contact member 4. Thereby, the conductive member 7 and the common contact member 4 are electrically connected. Consequently, a processing using a lead wire and solder becomes unnecessary, so that the number of assembly process can be reduced.

Figure 5A:
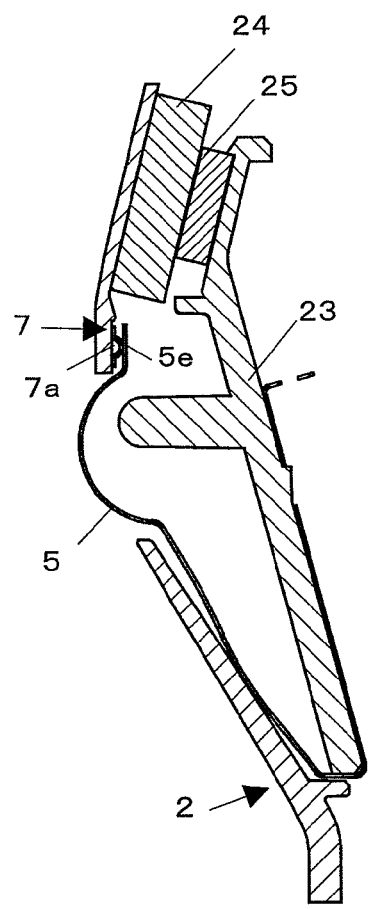
FIG. 5A is a side view of the signal contact member before mounting the electric shaver.
Figure 5B:
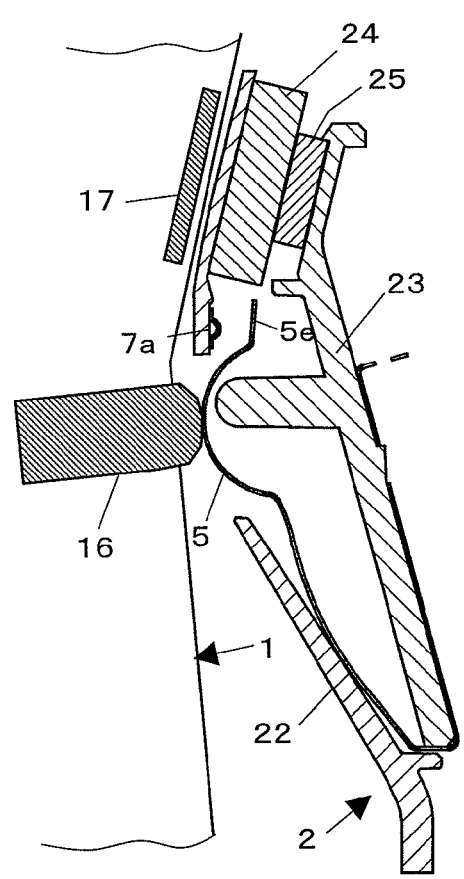
FIG. 5B is a side view of the signal contact member after mounting the electric shaver.

In the cleaning-charging apparatus 2 configured as above, when the electric shaver 1 is not mounted, since the detection contact 5e of the signal contact member 5 and the contact 7a of the conductive member 7 contact each other as shown in FIG. 5A, the detection circuit 62 of the cleaning-charging apparatus 2 (refer to FIG. 1A) detects nothing. On the other hand, when the compact electric apparatus 1 is mounted on the mounting base 21 of the cleaning-charging apparatus 2, the metal plate 17 of the electric shaver 1 is attracted by the magnet 24, and the terminal pin 16 pushes the signal contact member 5. Since the terminal pin 16 is connected to the control signal line 13, the control signal line 13 is electrically connected to the signal contact member 5. Simultaneously, since the detection contact 5e is displaced inward into the inside of the cleaning-charging apparatus 2, the detection contact 5e is electrically disconnected from the contact 7a of the conductive member 7, and the detection circuit 62 of the cleaning-charging apparatus 2 (refer to FIG. 1B) detects that the electric shaver 1 is mounted on the cleaning-charging apparatus 2. Similarly, the other two terminal pins 16 which are respectively connected to the positive power source line 11 and the negative power source line 12 also push the charge contact member 3 and the common contact member 4. Thereby, the positive power source line 11 and the negative power source line 12 are electrically connected to the charge contact member 3 and the common contact member 4. Under such a condition, the cleaning-charging apparatus 2 charges the built-in secondary battery of the electric shaver 1 and cleans the head portion 14. In addition, stoppers are provided on the contact base 23 to limit an amount of displacement of the respective contact members 3 to 5 being pressed in.

The present invention is not limited to the configuration of the above preferred embodiment, however, various modification are applicable within the scope of the invention. For example, the present detection structure can be applied to a battery charger of a mobile phone.

In the above mentioned description of the embodiment, although the cleaning-charging apparatus 2 of the electric shaver is exemplified, the detection structure in accordance with the present invention is not limited to the use for performing cleaning and charging simultaneously. It is possible to be applied to an apparatus having a single function such as a cleaning apparatus for cleaning the head portion of the electric shaver, for example. The detection structure may comprise at least two contact members. A first contact member may have a first contact electrically connected to a first electric line of a compact electric apparatus when the compact electric apparatus is mounted on a mounting base. In addition, a second contact member may have a second contact and a detection contact and is displaced by contacting with the compact electric apparatus when the compact electric apparatus is mounted on the mounting base, the second contact being connected to a second electric line of the compact electric apparatus when the compact electric apparatus is mounted on the mounting base, and the detection contact electrically connecting the second contact member to the first contact member when the compact electric apparatus is not mounted on the mounting base, and electrically disconnecting the second contact member from the first contact member by displacement thereof when the compact electric apparatus is mounted on the mounting base. Thereby, detection of mounting of the compact electric apparatus on the mounting base and signal transmission or electric power suppliance are enabled by the first contact member and the second contact member.

This application is based on Japanese patent application 2009-007692 filed Jan. 16, 2009 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A battery charger comprising:
a mounting base on which a compact electric apparatus having a built-in secondary battery is mounted;
a charging circuit which supplies a charging power;
a detection circuit which detects mounting of the compact electric apparatus on the mounting base;
a control circuit which controls the charging circuit to charge the built-in secondary battery when the detection circuit detects mounting of the compact electric apparatus on the mounting base;
a charge contact member which has a charge contact electrically connected to a positive terminal of the charging circuit and connected to a positive line of the compact electric apparatus when the compact electric apparatus is mounted on the mounting base to charge the built-in secondary battery of the compact electric apparatus;
a common contact member which has a common contact electrically connected to a negative terminal of the charging circuit and the detection circuit and connected to a negative power source line of the compact electric apparatus when the compact electric apparatus is mounted on the mounting base;
a signal contact member which has a signal contact and a detection contact and is displaced by contacting with the compact electric apparatus when the compact electric apparatus is mounted on the mounting base, the signal contact being electrically connected to the detection circuit and the control circuit and connected to a control signal line of the compact electric apparatus when the compact electric apparatus is mounted on the mounting base, and the detection contact electrically connecting the signal contact member to the common contact member when the compact electric apparatus is not mounted on the mounting base, and electrically disconnecting the signal contact member from the common contact member by displacement thereof when the compact electric apparatus is mounted on the mounting base, wherein
the detection circuit detects the mounting of the compact electric apparatus on the mounting base by detecting variations of electric potentials of the common contact member and the signal contact member.

2. The battery charger in accordance with claim 1, wherein the charge contact, the common contact and the signal contact are displaced corresponding to mounting of the compact electric apparatus on the mounting base; and
an amount of displacement of the signal contact when mounting the compact electric apparatus is set to be equal to or smaller than that of the charge contact and the common contact.

3. The battery charger in accordance with claim 2, wherein an amount of displacement of the detection contact is larger than that of the signal contact when mounting the compact electric apparatus.

4. The battery charger in accordance with claim 1, wherein the detection contact is formed at a position near to a front free end of a displacing portion of the signal contact member and the signal contact is formed in a middle of the displacing portion.

5. The battery charger in accordance with claim 4, wherein the detection contact is located above the signal contact.

6. The battery charger in accordance with claim 1, further comprising:
a conductive member having a contact formed on a first end thereof to be contacted with the detection contact when the compact electric apparatus is not mounted on the mounting base to constitute a normally closed switch and a second end which is normally connected to the common contact member, wherein
the second end is pressed to and electrically connected to the common contact member.

7. The battery charger in accordance with claim 1, wherein a permanent magnet which attracts a metal plate provided on a rear face of the compact electric apparatus is provided above the signal contact member.

8. The battery charger in accordance with claim 2, wherein the charge contact member, the common contact member and the signal contact member have the same shape and made of the same material; and
the charge contact, the common contact and the signal contact are arranged in horizontal, and the signal contact is located at a position vertically lower than those of the charge contact and the common contact.

9. A detection structure for detecting a mounted compact electric apparatus comprising:
a mounting base on which the compact electric apparatus is mounted;
a detection circuit which detects mounting of the compact electric apparatus on the mounting base;
a first contact member which has a first contact electrically connected to a first electric line of the compact electric apparatus when the compact electric apparatus is mounted on the mounting base;
a second contact member which has a second contact and a detection contact and is displaced by contacting with the compact electric apparatus when the compact electric apparatus is mounted on the mounting base, the second contact being connected to a second electric line of the compact electric apparatus when the compact electric apparatus is mounted on the mounting base, and the detection contact electrically connecting the second contact member to the first contact member when the compact electric apparatus is not mounted on the mounting base, and electrically disconnecting the second contact member from the first contact member by displacement thereof when the compact electric apparatus is mounted on the mounting base, thereby, enabling the detection of mounting of the compact electric apparatus on the mounting base and signal transmission or electric power suppliance by the first contact member and the second contact member.

10. The detection structure in accordance with claim 9, wherein
the first contact and the second contact are displaced corresponding to mounting of the compact electric apparatus on the mounting base; and
an amount of displacement of the second contact when mounting the compact electric apparatus is set to be equal to or smaller than that of the first contact.

11. The detection structure in accordance with claim 10, wherein
an amount of displacement of the detection contact is larger than that of the second contact when mounting the compact electric apparatus.

12. The detection structure in accordance with claim 9, wherein
the detection contact is formed at a position near to a front free end of a displacing portion of the second contact member and the second contact is formed in a middle of the displacing portion.

13. The detection structure in accordance with claim 12, wherein
the detection contact is located above the second contact.

14. The detection structure in accordance with claim 9, further comprising:
a conductive member having a contact formed on a first end thereof to be contacted with the detection contact when the compact electric apparatus is not mounted on the mounting base to constitute a normally closed switch and a second end which is normally connected to the first contact member, wherein
the second end is pressed to and electrically connected to the first contact member.

15. The detection structure in accordance with claim 9, wherein
a permanent magnet which attracts a metal plate provided on a rear face of the compact electric apparatus is provided above the second contact member.

16. The detection structure in accordance with claim 10, wherein
the first contact member and the second contact member have the same shape and made of the same material; and
the first contact and the second contact are arranged in horizontal, and the second contact is located at a position vertically lower than that of the first contact.

17. The battery charger in accordance with claim 2, wherein
the detection contact is formed at a position near to a front free end of a displacing portion of the signal contact member and the signal contact is formed in a middle of the displacing portion.

18. The battery charger in accordance with claim 17, wherein
the detection contact is located above the signal contact.

19. The battery charger in accordance with claim 3, wherein
the detection contact is formed at a position near to a front free end of a displacing portion of the signal contact member and the signal contact is formed in a middle of the displacing portion.

20. The battery charger in accordance with claim 19, wherein
the detection contact is located above the signal contact.

21. The detection structure in accordance with claim 10, wherein
the detection contact is formed at a position near to a front free end of a displacing portion of the second contact member and the second contact is formed in a middle of the displacing portion.

22. The detection structure in accordance with claim 21, wherein
the detection contact is located above the second contact.

23. The detection structure in accordance with claim 11, wherein
the detection contact is formed at a position near to a front free end of a displacing portion of the second contact member and the second contact is formed in a middle of the displacing portion.

24. The detection structure in accordance with claim 23, wherein
the detection contact is located above the second contact.

* * * * *